May 24, 1966  N. T. SIMOPOULOS  3,252,371
FILM PROJECTING SYSTEM
Filed May 29, 1963  2 Sheets-Sheet 1
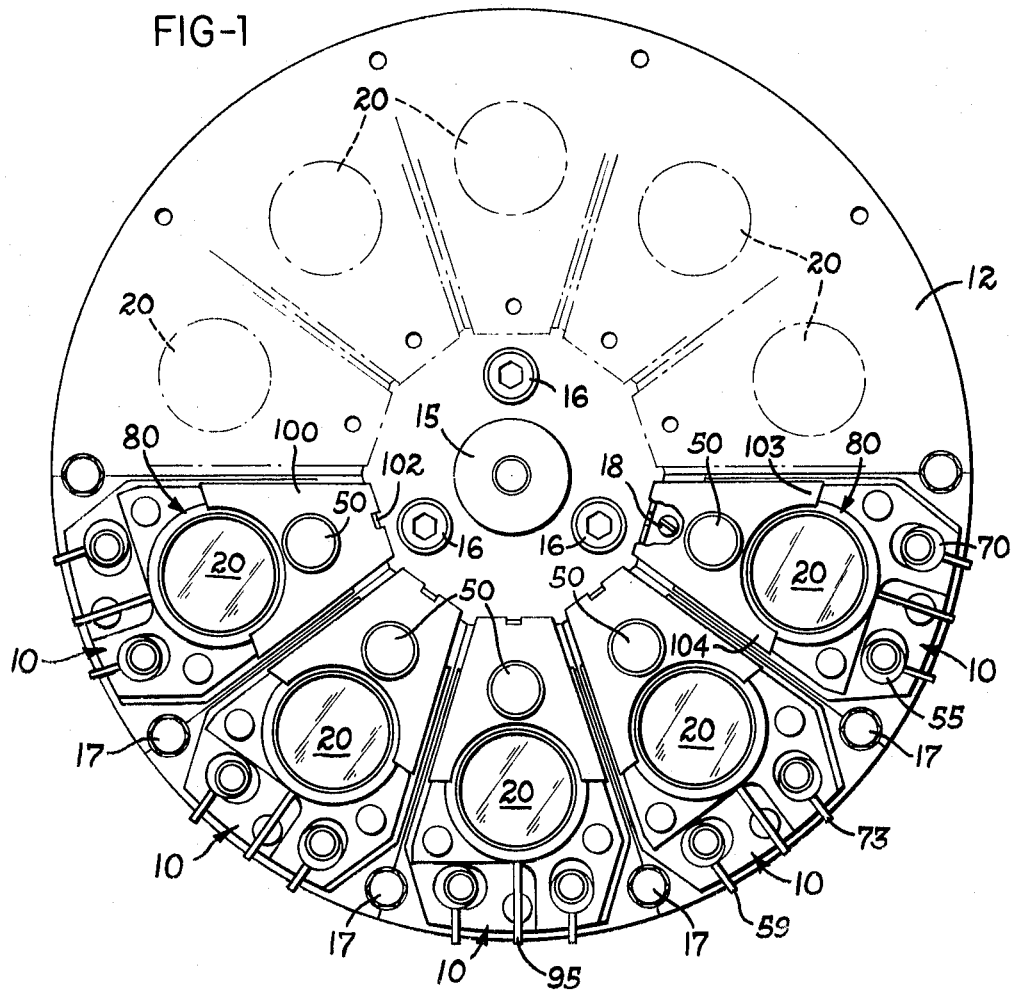
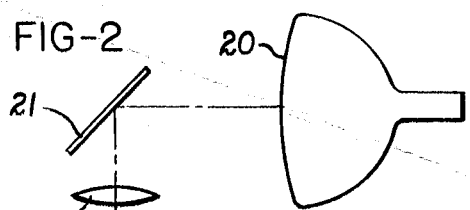
INVENTOR
NICHOLAS T. SIMOPOULOS
BY
Marechal, Biebel, French & Bugg
ATTORNEYS May 24, 1966  N. T. SIMOPOULOS  3,252,371
FILM PROJECTING SYSTEM
Filed May 29, 1963  2 Sheets-Sheet 2
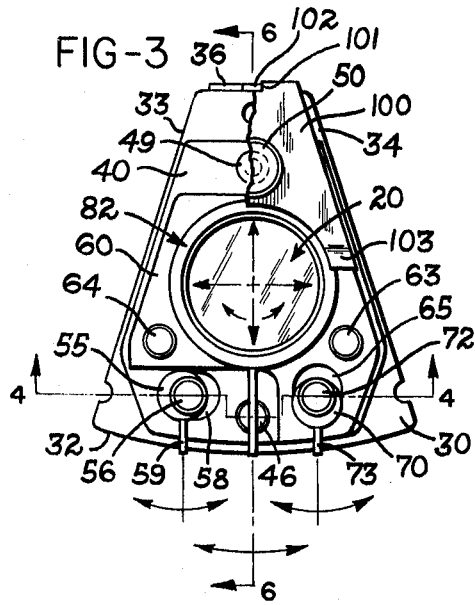
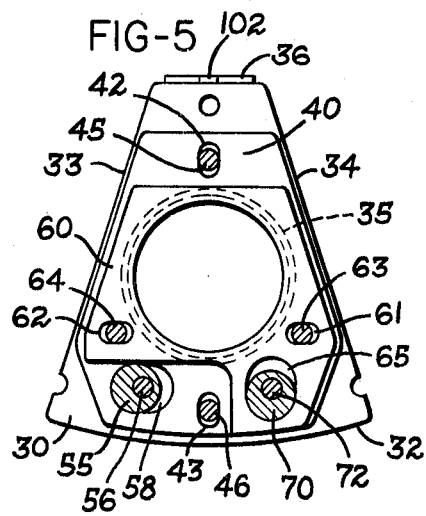
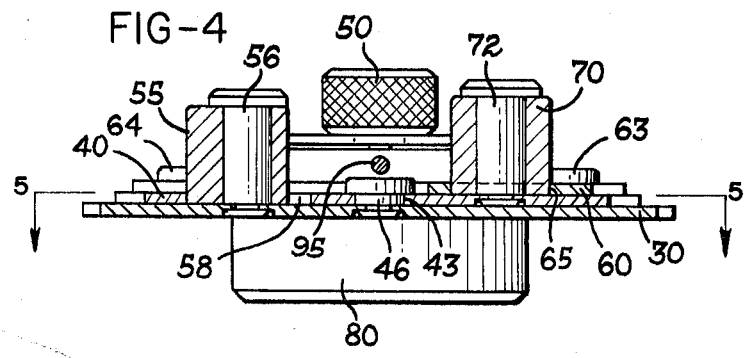
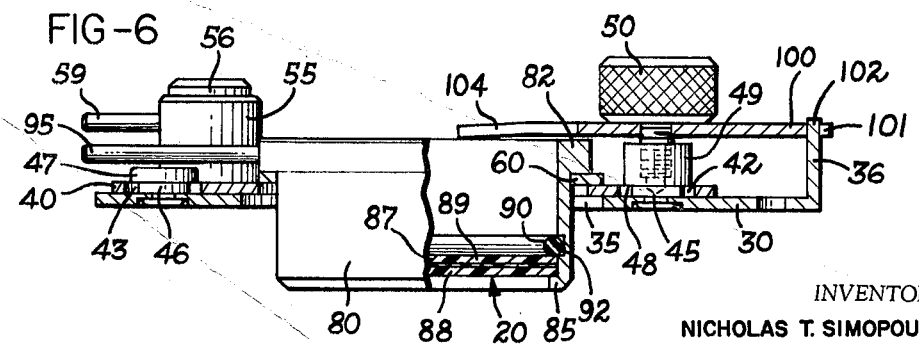
INVENTOR.
NICHOLAS T. SIMOPOULOS
BY
Marechal, Biebel, French & Bugg
ATTORNEYS

United States Patent Office 3,252,371
Patented May 24, 1966

3,252,371
FILM PROJECTING SYSTEM
Nicholas T. Simopoulos, Dayton, Ohio, assignor to Dayton Electronic Products Company, Inc., Dayton, Ohio, a corporation of Ohio
Filed May 29, 1963, Ser. No. 284,143
9 Claims. (Cl. 88—27)

This application pertains to a film projecting system and more particularly to such a projection system wherein provision is made for the adjustment of the position of the film in the optical system.

In film or slide projecting devices and particularly those devices which employ a turret or a plurality of films for still projection, there often arises a need for positioning the film both laterally and rotationally with respect to the projection system. This requirement particularly occurs where the films become substantially a permanent part of the apparatus. A particular example of this is where the films individually represent different line drawings or maps of various areas or locations which form an input into a system and which must be initially aligned and remain in alignment throughout use.

It is therefore an important object of this invention to provide a film holder device in a film projection system wherein the film may be positioned both laterally and rotationally of the axis of the projection system.

Another important object of this invention is the provision of a film retaining device wherein the film may be positioned laterally to the axis of the projection system along at least two mutually perpendicular lines.

A still further object of this invention is the provision of a film holder wherein the film may be positioned rotationally of the axis of the projection system.

Still another object of this invention is the provision of a turret of film holders wherein each film holder includes provision for the lateral and/or rotational adjustment of the film.

Yet another object of this invention is the provision of a film holder assembly which is adapted for use with a plurality of such assemblies and which provides for the retaining and adjustment of a film along two mutually perpendicular lines laterally of the projection axis and for adjustment rotationally of the axis, together with a retainer or clamp for holding the film in a predetermined adjusted position.

A still further object of this invention is the provision of a film holder wherein the film may be easily removed and replaced by another film.

Still a further object of this invention is the provision of a film holder assembly characterized by simplicity of construction and ease of operation.

Another object of this invention is the provision of an assembly for supporting a map for projection and read out, together with provision for adjusting the map along north-south and east-west coordinates as well as provision for adjusting the map in azimuth.

These and other objects and advantages of the invention will be apparent from the following description, the accompanying drawings and the appended claims.

In the drawings:

FIG. 1 is a fragmentary plan view of a turret of film holder assemblies constructed according to this invention;

FIG. 2 is a dagrammatic illustration of a projection system in which the turret of FIG. 1 may be used;

FIG. 3 is a partially broken away plan view of a film holder assembly constructed according to this invention;

FIG. 4 is a vertical section of the assembly through the adjusting cams taken generally along the line 4—4 of FIG. 3;

FIG. 5 is a section through the assembly taken generally along the line 5—5 of FIG. 4, showing the base plate, the adjusting plate and the film support plate in plan, with the film holder removed; and FIG. 6 is a longitudinal section through the holder assembly which is taken generally along the line 6—6 of FIG. 3.

Referring to the figures of the drawings which represent a preferred embodiment of the invention, a turret of assemblies 10 is shown in FIG. 1 as being provided with a turret plate or support base 12 upon which a plurality of the assemblies 10 are mounted in angularly spaced relation about a central hub 15. The turret 12 is mounted by bolts 16 for rotation on the hub 15 and for selective movement of the assemblies 10 into an indexed position wherein a selected one of the assemblies 10 is positioned in a projecting station. Each assembly 10 may be retained on the base 12 by hexagonal retaining nuts 17 at the plate periphery and small retaining screws 18 at the inner end of each assembly 10.

The preferred embodiment which is disclosed in detail herein shows a film holder assembly which is used with a turret of such assemblies forming a part of a video mapper, such as the Video Mapping Set AN/GPA–70. This device provides a radar approach control center (RAPCON) with a selection of video map displays showing, for instance, airport runways, runway extension marks, beacon points, boundary markers, et cetera, and makes them available to the operator as an overlay presentation on his radar screen in addition to the normal radar information. Thus, a turret of still films, each representing a line drawing of a map, may be employed, with the maps made to a precise scale for the purpose of encompassing or covering a preselected radar range. For instance, one map may be provided for a ten nautical mile radar range, and others for twenty, forty, eighty, etc., nautical miles, coinciding with the selected range of the search radar at any particular moment.

It therefore becomes important to the operation of such a system that each of the films or maps supported within the assemblies 10 be positionable along coordinates of latitude, longitude and azimuth so that the projected details may be accurately superimposed upon the operator's scope. It is also important that a provision be made for retaining or securing the film in its adjusted position.

An example of a suitable projection system within which this invention may be used is shown in FIG. 2 as including a cathode ray tube 20 upon which sweeps may be generated corresponding to the position and range of the search radar. The image of these sweeps may be directed by a mirror 21 through a lens 22 onto the film plate 25. A photomultiplier tube 26 may be positioned beneath the film plate 25 to translate the light signals which are passed therethrough into suitable electrical signals for presentation, as desired, at a remote point.

Referring to FIGS. 3–6 for the details of one of the assemblies 10, it is shown as including a base or mounting plate 30. The plate 30 may be formed generally in the shape of a segment of a circular disk to include a curved or circular outer edge 32 and tapered sides 33 and 34, although it will be understood that the precise shape of the plate 30 may be varied within wide limits, according to the intended use of the assembly 10. The base 30 is formed with an enlarged central opening 35 substantially in the center thereof, and is further formed with an upwardly extending tab or support 36 to receive the film holder locking plate.

A first adjusting plate 40 is received on the mounting plate 30 and is mounted thereon for a limited adjusting or translational movement. Referring, for instance, to FIG. 5, it can be seen that the plate 40 is slotted at an inner end thereof at 42 and at the outer end at 43 to receive respectively a support 45 and a rivet 46 each mounted on the base plate 30. As shown in FIG. 6, the front plate supporting rivet 46 is formed with a head 47 and serves to retain the plate 40 in its assembled position on the base plate 30. The rear support 45 is shouldered as indicated at 48 and has an upper part 49 which is threaded to receive a knurled screw 50.

Means for adjustably moving the plate 40 in translational movement in one direction which may, for instance, be oriented in the north-south direction of the projection system, includes a first adjusting cam 55 mounted for rotation on the base 30 by a support pin 56. The cam 55 is actually formed as a cylindrical element having an eccentric or offset center through which the support pin 56 is received, so that it provides eccentric movement upon rotation. The lower end of the cam 55 is received within a suitable transverse slotted opening 58 formed in the plate 40 to provide for the sliding translational movement of the plate 40 upon rotation of the cam 55. The cam 55 may preferably be provided with a radially extending pin 59 extending to the front of the assembly pin for convenience of an operator in making the north-south adjustment.

The assembly 10 further includes a second or film holder mounting plate 60 which is mounted on the first plate 40 for limited translational or transverse movement in a direction generally normal to the movement of the first plate. Thus, the second plate 60 is slotted as indicated at 61 and 62 to receive the bodies of a pair of mounting rivets 63 and 64 which are supported on the first plate 40 and extend through the second plate 60. The plate 60 is further slotted as indicated at 65 to receive the lower end of a second adjusting cam 70 therein. As shown in FIG. 4, the cam 70 is mounted on the first plate 40 in eccentric relation on a pin 72, and is further provided with a generally radially extending adjusting pin 73, as shown in FIGS. 1 and 3. The rotation of the cam 70 by the pin 73 causes the second plate 60 to move in a generally east-west translational movement transverse to the movement of the first plate 40.

Means for supporting the film includes a generally tubular film holder 80, which is shown partially in section in FIG. 6. The film holder 80 is shouldered as indicated at 82 and is received and supported on the assembly directly on the upper surface of the plate 60. The openings formed in the base plate 30 and the first plate 40 are larger than the outer cylindrical diameter of the holder 80 to permit the adjusting movement of the holder 80 on the holder support plate 60.

The holder 80 has a cylindrical body which extends downwardly through the openings terminating in an inwardly directed film supporting flange 85 to support the film plate 20. As may be seen in FIG. 6, the film plate 20 may consist of a sandwich of a pair of glass plates 87 and 88 with a film 89 between. The film plate 20 is conveniently held within the holder 80 by an O-ring 90 which is received within an annular groove 92. When it is desired to remove the film 20, the O-ring 90 is readily removed permitting the upward withdrawal of the film out of the holder.

Means for positioning the film rotationally about the axis of the projection system, such as for positioning the film in azimuth, include a pin 95 extending radially forwardly from the flange portion 82 of the film holder 80, for the convenience of an operator in rotating the holder 80, and the film 20 therein, about its axis.

Each of the assemblies 10 also include clamp means which extend from the film holder 80 to the base 30 to retain the holder and the adjusting plates in the predetermined adjusted position on the base plate 30. The clamp means consists of a bifurcated locking plate 100 which is notched at 101 to mount on the projecting tab 102 of the support 36. The forward ends of the bifurcated arms 103 and 104 (FIG. 1) are inclined slightly downwardly as shown in FIG. 6 and engage the holder 80 at the radially flat portion of the upper surface of the flange 82. The knurled bolt 50 engages the upper surface of the retainer 100 and, when adjusted inwardly, causes the bifurcated fingers 103 and 104 to bear downwardly against the holder 80. The force which is thus effected in transmitted by the holder 80 through each of the plates 60 and 40 to the base plate 30 thereby effectively locking the holder in its adjusted position.

In use, the operator may loosen the nut 50, or he may adjust it to the point where each of the cams 55 and 70, and the holder 80 may be rotated, but with some difficulty. Then, while observing the projected display through the individual selected film, he may adjust the cams 55 and 70, and rotate the holder 80 until the projected display is in its correct longitude, latitude, and azimuth positions. This may be readily done as each of the assemblies 10 is positioned within the optical system, and the films will then be retained in their correct adjusted positions for subsequent use.

It is therefore seen that this invention provides an apparatus for holding one or a plurality of projection films and provides the adjustment of the film with respect to the axis of the projection system in two movements in a plane transverse to the axis and in rotational movement with respect to the axis so that the material on the film is correctly and accurately located, as desired. Furthermore, the invention provides a turret of such assemblies so that each film in the turret may be positioned in a predetermined relation to the projection system so that as the films are indexed into the projection system, they may be adjusted to a desired position and thereafter retain such position.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a film projecting system including apparatus for supporting a still film in an optical path, the improvement comprising a base fixed relative to said path, a first plate member, means mounting said first plate member on said base for limited movement in a direction generally transverse to said path, first cam adjusting means rotatably mounted on said base in coacting engagement with said first member for effecting said movement thereof upon the rotation of said first cam adjusting means, a second plate member, means supporting said second plate member on said first member for limited movement transverse to said optical path in a direction generally normal to the direction of movement of said first member, second cam adjusting means rotatably mounted on said first member in coacting engagement with said second member to effect said movement thereof upon the rotation of said second cam adjusting means, a film holder having means therein for supporting a film to be projected, and means mounting said holder in said optical path on said second member.

2. In a film projecting system including apparatus for supporting a still film in an optical path, the improvement comprising a base fixed relative to said path, a first plate member, means mounting said first plate member on said base for limited movement in a direction generally transverse to said path, first cam adjusting means rotatably mounted on said base in coacting engagement with said first member for effecting said movement thereof upon the rotation of said first cam adjusting means, a second plate member, means supporting said second plate member on said first member for limited movement transverse to said optical path in a direction generally normal to the direction of movement of said first member, second cam adjusting means mounted on said first member in coacting engagement with said second member to effect the movement thereof upon the rotation of said second cam adjusting means, a film holder having means therein for supporting a film to be projected, means rotatably mounting said holder in said optical path on said second member, and adjustable clamp means extending from said base and in engagement with said holder for retaining said holder on said second plate member and securing said first and second members in adjusted position.

3. In a film projecting system, a film holder assembly for positioning a film to be projected in latitude, longitude and azimuth, comprising, a base generally fixed with respect to the optical path of said system, a first plate, means mounting said first plate on said base for limited translational movement in latitude, a cam mounted on said base having a portion engageable with said first plate for effecting said movement in latitude thereof, a second plate, means mounting said second plate on said first plate for limited translational movement in longitude, a second cam mounted on said first plate and having a portion engageable with said second plate to effect said longitudinal movement thereof, a film holder for receiving a film to be positioned by said assembly for projection, means mounting said film holder on said second plate for limited rotational movement thereof in azimuth, and clamp means extending between said film holder and said base and effective to retain said holder and said plates in adjusted relation on said base.

4. In a film projection system, a film holder assembly for positioning a film to be projected in longitude, latitude and azimuth, comprising, a base generally fixed with respect to the optical path of said system, means in said base defining an opening generally aligned with the light path of the projecting system, a first plate having means defining an opening, means mounting said first plate on said base for translational movement in latitude with said openings being generally aligned, a second plate having means defining an opening, means mounting said second plate on said first plate for translational movement with respect to said first plate in longitude with said opening therein being generally aligned with said base and first plate opening, a generally tubular film holder having means for receiving a film generally transversely thereof to be positioned by said assembly for projection, and means mounting said film holder on said second plate with a portion thereof extending through said aligned base and plate openings and providing for rotational movement thereof to position such film in azimuth.

5. In a film projection system for projecting selected ones of a plurality of still films at a projecting station comprising, a turret plate, means mounting said turret plate for rotation about an axis, a plurality of substantially identical film holder assemblies, means on said turret plate supporting said assemblies in angularly spaced relation thereabout for selective movement into said projection station as said turret is rotated, a film holder on each of said assemblies, means on said assemblies for mounting said film holder for adjusting movement in at least two directions which are generally normal to the optical path at said projection station including a first plate on said assembly having means defining an aperture; mounted for movement in one of said directions, a film holder support plate mounted in superimposed relation on said first plate for movement in said second direction and having means defining an aperture in general alignment with the said aperture in said first plate, and means mounting said film holder on said support plate with such a still film therein being positioned in general alignment with said aligned apertures and providing for angular adjustment of said holder in the plane of the film.

6. In a map projection system for presentation of a map in superimposing relation on a radar video display, the improvement comprising a holder assembly for positioning a map transparency and providing for adjustment thereof in latitude, longitude, and azimuth including a base having means therein defining a projection opening, a first plate having a projection opening therein, mutually engaging means mounting said first plate on said base for limited translational movement in a first direction generally normal to the optical path of the projection system, adjustable means engaging said first plate to effect incremental adjusting movements in said first direction, a second plate having means therein defining a further projection opening, means mounting said second plate on said first plate providing for limited translational movement of said second plate with respect to said first plate in a direction transverse with respect to said first direction with said opening therein being aligned generally with the corresponding openings in said first plate and said base, adjustable means engageable with said second plate for effecting incremental adjusting movements of said second plate in said transverse direction, and a holder adapted to receive a map transparency therein mounted on said second plate for supporting such transparency in said optical path at said aligned openings and being rotatable with respect to said second plate.

7. The system of claim 6 in which said holder is of generally tubular shape with a portion thereof extending through said aligned openings, an inwardly turned, annular ledge on said holder adapted to receive such transparency thereon, and an elastomeric ring received in said holder for retaining such transparency on said ledge.

8. The system of claim 6 further including a turret, and a plurality of said assemblies mounted in angularly spaced relation on said turret for selective positioning in the optical system of said projection system for presenting selected maps on said radar video display.

9. In a map projection system for presentation of a map in superimposing relation on a radar video display, the improvement comprising a holder assembly for positioning a map transparency and providing for adjustment thereof in latitude, longitude, and azimuth including a base having means therein defining a projection opening, a first plate having a projection opening therein, mutually engaging means mounting said first plate on said base for limted translational movement in a first direction generally normal to the optical path of the projection system, manually adjustable means mounted on said base and engaging said first plate to effect incremental adjusting movements in said first direction, a second plate having means therein defining a further projection opening, means mounting said second plate on said first plate providing for limited translational movement of said second plate with respect to said first plate in a direction transverse with respect to said first direction with said opening therein being aligned generally with the corresponding openings in said first plate and said base, manually adjustable means on said first plate engageable with said second plate for effecting incremental adjusting movements of said second plate in said transverse direction, an elongated transparency holder adapted to receive a transparency therein mounted on said second plate with a portion thereof extending through the said aligned openings and being rotatable with respect to said second plate, and clamp means mounted on said base and in engagement with said transparency holder for retaining said holder in position and for maintaining the relative adjustments of said first and second plates and said holder.

References Cited by the Examiner

UNITED STATES PATENTS

| | | | |
|---|---|---|---|
| 893,714 | 7/1908 | Finch | 88—27 |
| 1,327,898 | 1/1920 | Barr | 88—27 |
| 1,902,278 | 3/1933 | Chase | 352—102 |
| 2,206,134 | 7/1940 | Streyckmans. | |
| 2,773,420 | 12/1956 | Nistri | 88—24 |

NORTON ANSHER, *Primary Examiner.*

HAROLD H. FLANDERS, *Assistant Examiner.*